US012744784B2

(12) United States Patent
Rosenfeld et al.

(10) Patent No.: US 12,744,784 B2
(45) Date of Patent: Sep. 22, 2026

(54) APPARATUS AND METHOD FOR PROVIDING REVOCATION OF USER ACCESS IN AN ACTIVE SESSION

(71) Applicant: INTERNATIONAL BUSINESS MACHINES CORPORATION, Armonk, NY (US)

(72) Inventors: Eric Rosenfeld, Pleasant Valley, NY (US); Bryan Childs, Poughkeepsie, NY (US); Mark Nelson, Poughkeepsie, NY (US); Bruce Robert Wells, Stanfordville, NY (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 18/510,746

(22) Filed: Nov. 16, 2023

(65) Prior Publication Data

US 2025/0168168 A1 May 22, 2025

(51) Int. Cl.
*H04L 9/40* (2022.01)

(52) U.S. Cl.
CPC .......... *H04L 63/101* (2013.01); *H04L 63/102* (2013.01); *H04L 63/20* (2013.01)

(58) Field of Classification Search
CPC ...... H04L 63/101; H04L 63/102; H04L 63/20
See application file for complete search history.

(56) References Cited

U.S. PATENT DOCUMENTS

| | | | |
|---|---|---|---|
| 8,429,726 | B2 | 4/2013 | Cahill |
| 9,477,838 | B2 | 10/2016 | Moloian et al. |
| 2007/0036167 | A1 | 2/2007 | Hu |

(Continued)

FOREIGN PATENT DOCUMENTS

| | | |
|---|---|---|
| ES | 2381199 | 5/2012 |

OTHER PUBLICATIONS

Boneh et al., A Method for Fast Revocation of Public Key Certificates and Security Capabilities, Singapore Management University, Institutional Knowledge at Singapore Management University, Proceedings of the 10th conference on USENIX Security Symposium, Washington, D.C., Aug. 13-17, 2001, Research Collection School Of Information Systems, Published Aug. 13, 2001, 13 pages.

(Continued)

*Primary Examiner* — Harris C Wang
(74) *Attorney, Agent, or Firm* — Onyx IP Group

(57) ABSTRACT

A computing system employs one or more security managers that, in response to an active session user revocation request, such as from a security administrator, to revoke a user during an active session, update an active session access revocation list that includes data representing the user. The security manager revokes active user access to protected system resources for the user based on the updated active session access revocation list, during the active session. The active session user revocation request also causes an update of a user profile in a security manager database that allows the security manager to deny authentication of the user for new sessions. The updated active session access revocation list serves as a type of centralized list with all users that have been fully revoked on the computing system. Related methods and computer products are also described.

20 Claims, 6 Drawing Sheets

(56) References Cited

U.S. PATENT DOCUMENTS

| | | | | |
|---|---|---|---|---|
| 2008/0263640 | A1* | 10/2008 | Brown | H04L 63/0807<br>726/5 |
| 2015/0143131 | A1* | 5/2015 | Kuno | G06F 12/1408<br>713/189 |
| 2018/0139200 | A1* | 5/2018 | Gordon | H04L 63/08 |
| 2022/0400009 | A1* | 12/2022 | Persaud | H04L 67/1044 |
| 2023/0289461 | A1* | 9/2023 | Jasinski | G06F 21/6218 |

OTHER PUBLICATIONS

Yu et al., Achieving Secure, Scalable, and Fine-grained Data Access Control in Cloud Computing, 2010 Proceedings IEEE Infocom, Computer Science, DOI: 10.1109/INFCOM.2010.5462174, Date Added to IEEE Xplore: May 6, 2010, 9 pages.

* cited by examiner

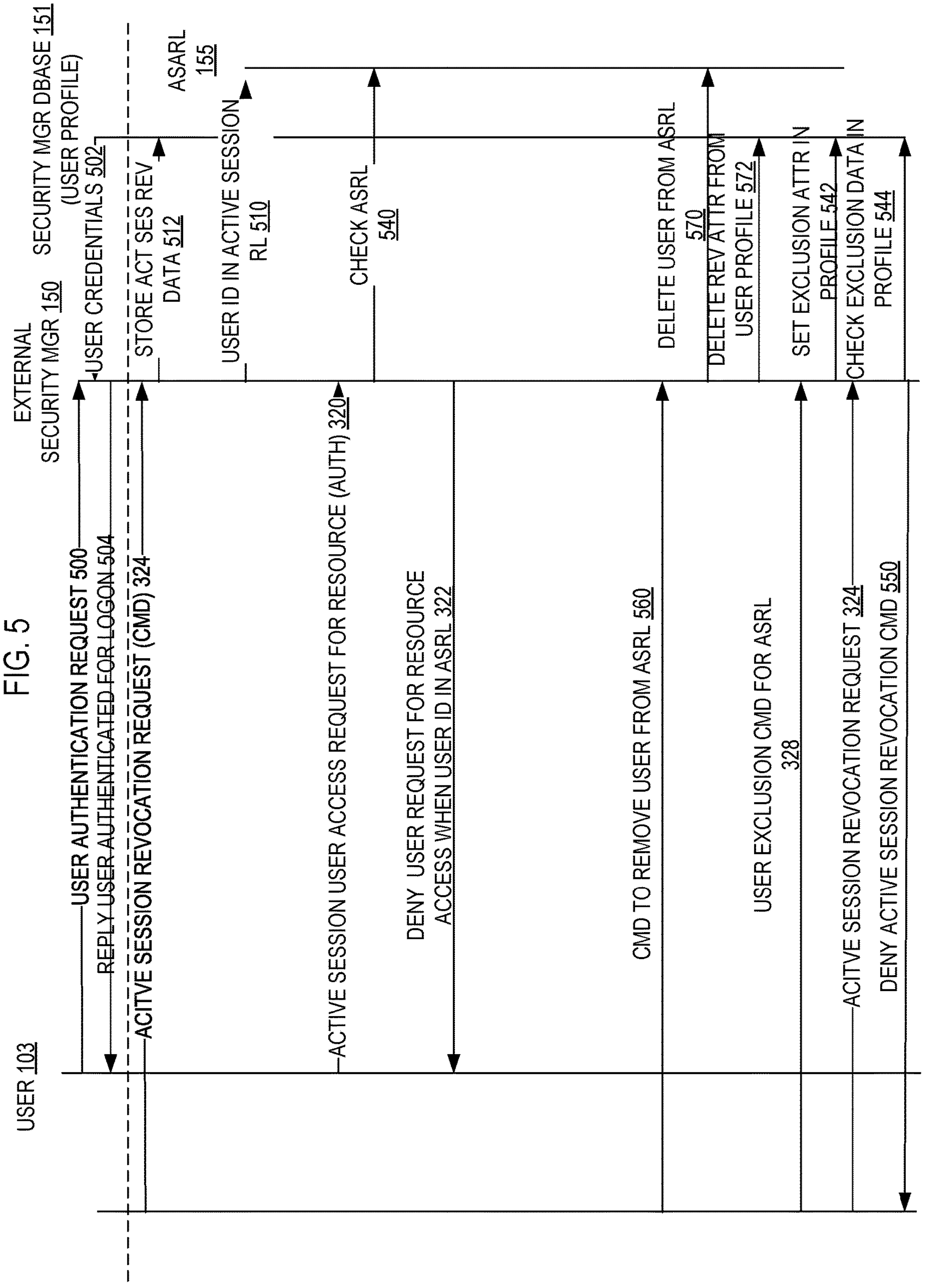

FIG. 5
USER 103
EXTERNAL SECURITY MGR 150
SECURITY MGR DBASE 151 (USER PROFILE)
USER AUTHENTICATION REQUEST 500
USER CREDENTIALS 502
REPLY USER AUTHENTICATED FOR LOGON 504
ACITVE SESSION REVOCATION REQUEST (CMD) 324
STORE ACT SES REV DATA 512
ASARL 155
USER ID IN ACTIVE SESSION RL 510
ACTIVE SESSION USER ACCESS REQUEST FOR RESOURCE (AUTH) 320
CHECK ASRL 540
DENY USER REQUEST FOR RESOURCE ACCESS WHEN USER ID IN ASRL 322
CMD TO REMOVE USER FROM ASRL 560
DELETE USER FROM ASRL 570
DELETE REV ATTR FROM USER PROFILE 572
USER EXCLUSION CMD FOR ASRL 328
SET EXCLUSION ATTR IN PROFILE 542
ACITVE SESSION REVOCATION REQUEST 324
CHECK EXCLUSION DATA IN PROFILE 544
DENY ACTIVE SESSION REVOCATION CMD 550

APPARATUS AND METHOD FOR PROVIDING REVOCATION OF USER ACCESS IN AN ACTIVE SESSION

BACKGROUND

The present disclosure relates to methods, apparatus, and products for revoking user access to one or more system resources.

SUMMARY

According to embodiments of the present disclosure, various methods, apparatus and products for revoking user access to one or more system resources are described herein. In some aspects, an active session user revocation request to revoke a user during an active session is received from a security administrator. An active session access revocation list is updated in response to the active session user revocation request, that includes data representing the user, such as a user identifier. Based on the updated active session access revocation list, the user is revoked from having active session access to protected system resources for authorization requests during the active session and for future authentication logon requests. In some examples, the active session access revocation list is shared among security managers in different security systems.

BRIEF DESCRIPTION OF THE DRAWINGS

FIG. 5 sets forth a communication flow diagram for revoking user access during an active session according to aspects of the present disclosure.

DETAILED DESCRIPTION

Figure 1:
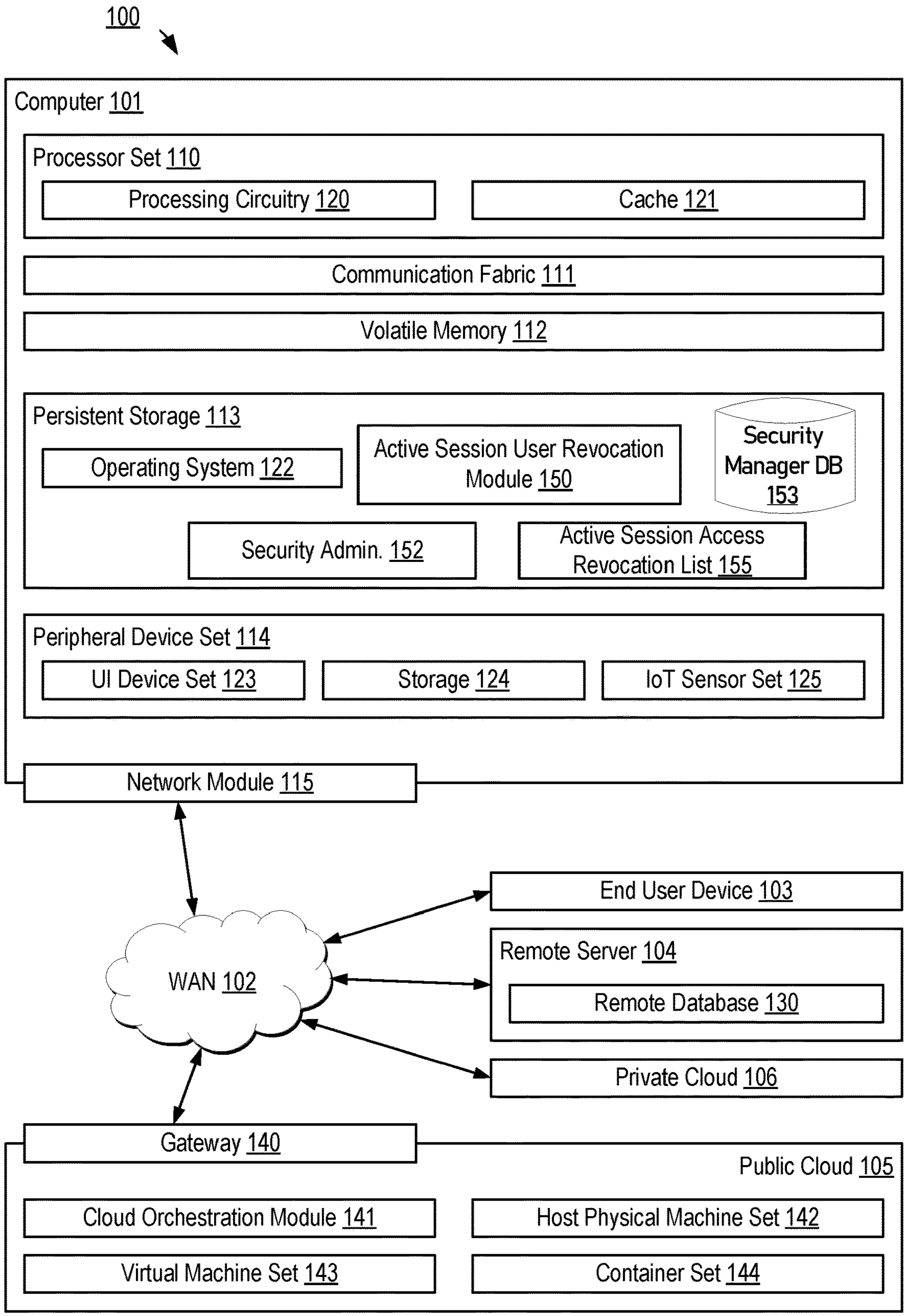
FIG. 1 sets forth an example computing environment according to aspects of the present disclosure.

Computing systems employ security managers, such as an IBM Resource Access Control Facility (RACF®) for z/OS® which is a security software product, such as a security kernel of the z/OS security server environment that enables the protection of mainframe resources by making access control decisions for users through a suitable interface or series of interfaces such as application programming interfaces (APIs), resource managers (RMs), a system authentication facility (SAF) or other suitable interface. Generally, the security manager processes multifactor user authentication requests to allow a user to log on to the system and be granted an active session with the system if authentication is granted. During an active session, the security manager receives user authorization requests which are user access requests to protected system resources such as data objects, files, applications, address spaces, devices, ports, and other protected system resources.

The security manager protects system resources by granting access only to authorized users of the protected resources. The security manager retains information about users, resources, and access authorization structures called profiles in its database, and the security manager refers to these profiles when deciding which users should be permitted access to protected system resources. Major subsystems such as CICS® and DB2® can use the facilities of RACF to protect transactions and files.

Computing systems allow for the use of revocation access commands (also referred to as revoke access commands) by security administrators to revoke access to users of system resources. However, when a revocation access command is received from a system administrator by the security manager (e.g., RACF) during an active session of a user, the revocation request stays pending until a next user login. As such, users who are administratively revoked only have future accesses from new logons revoked. Users that are defined in active address spaces for example continue to have access until a session has ended such as when a log off has occurred. For example, a batch run of jobs may have been started by a user before the revocation of the user was requested. All jobs the user started will be granted access to system resources until they are completed. This results in a security vulnerability by allowing continued access to potentially highly sensitive resources even after a revocation access command has been issued.

A new facility is disclosed that allows a user to be fully revoked which causes all future active session authorization requests to access protected system resources (and if desired all future user authentication requests) to fail for that user. A user includes user devices, executing software programs or any other entity that has an identifier associated therewith, or can be identified from data in the system, and is issued an authorization request to access a protected system resource such as a device, data sets, applications, other software code, or other defined system resources. As used herein a user also includes a group of users in some implementations. In some implementations, where address spaces of the system are assigned to users, a user's defined active address spaces are revoked during the active session. In some implementations, a centralized user revocation list, also referred to as an active session access revocation list (ASARL), is maintained by the security manager. In some examples, the active session access revocation list is a list of user identifiers (IDs) that a security administrator identifies as fully revoked. In some examples this list is updated with specified user identifiers as active session revocation requests are issued by the administrator. When an access request is made for a user during an active session, the list is interrogated and if the user ID associated with the access request is in the list, the access attempt is disallowed during and the active session.

In addition, in some implementations, all future authorization requests for that user fail, and future logon authentication requests fail. As a result, the fully revoked user no longer has access to any protected system resources. The disclosed facility strengthens the security of the affected platform by making the platform more securable and allows administrators to disallow all system resource accesses for specified users, both for new sessions and active sessions.

In some implementations, an administrator can issue an exclusion order command for a user or group of users to the security manager to exclude users from the ASARL being revoked during active sessions. The security manager uses a user ID identified by the exclusion order command and stores exception data in the corresponding user profile indicating that the user is exempt from being in the active session access revocation list. When an active session revocation request is received, the security manager checks the user profile of the associated user ID in the request to see if there is an exception set for the user, if so the security manager sends a reply denying the active session revocation request to the administrator.

One or more embodiments update an active session access revocation list that includes data representing the revoked user, such as a user identifier, in response to an active session user revocation request to revoke a user during an active session. In some implementations the active session user revocation request is a command that includes a user ID of the user that an administrator wishes to have revoked during an active session of the user. A security manager adds the user ID from the active session suer revocation request to a data structure in memory, such as a list. When the user requests access to system resources during an active session, the security manager revokes active user access to protected system resources for the user when the user's user ID is on the active session access revocation list.

In some implementations, the security manager revokes active user access to protected system resources by denying future active session user access for subsequent active session authorization requests for the users that are on the list. In certain implementations, the security manager denies future user logon authentication of the user based on the active session user revocation request when a user profile is also updated to reflect that the active session user revocation request was issued for the user. For example, the security manager, in response to receiving the active session user revocation request, stores a user identifier associated with the user, in the active session access revocation list in memory and also stores user revocation data in a user profile database, such as revocation status data indicating that the user is revoked. The security manager uses the active session access revocation list to revoke user access during an active session and the security manager uses the user revocation data in the user profile database to deny user authentication after the user logs off and tries to logon to the system again.

With reference now to FIG. 1, FIG. 1 sets forth an example computing environment according to aspects of the present disclosure. Computing environment 100 contains an example of an environment for the execution of at least some of the computer code involved in performing the various methods described herein, such as active session user revocation module 150. In addition to active session user revocation module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 that includes stored executable instructions including an operating system 122, a security manager 300 (e.g., part of a security server), a security manager database 151, an active session user revocation module 150, a security administrator 152 an active session access revocation list (ASARL) 155, peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may also be referred to as a computing system and may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Such computer processors as well as graphic processors, accelerators, coprocessors, and the like are sometimes referred to herein as a processing device or processing circuitry. A processing device and a memory operatively coupled to the processing device are sometimes referred to herein as an apparatus. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in active session user revocation module 150 and the security administrator 152 typically includes at least some of the computer code involved in performing the computer-implemented methods described herein. Security servers, security administrators and security managers are implemented by the processor set which may be implemented across multiple hardware systems including multiple hardware servers. In some examples the security servers, security administrators and security managers are one or more processors executing software code modules. For purposes of explanation, in one example, the active session user revocation module 150 will be described as being a facility within the RACF, however it will be recognized that the operations may be implemented by any suitable component.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
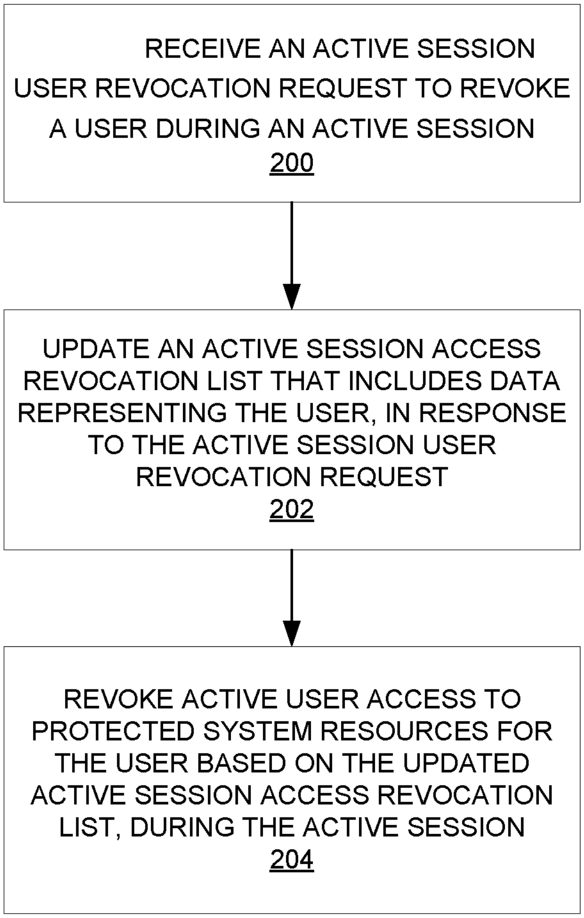
FIG. 2 sets forth sets forth a flowchart of an example process for revoking user access during an active session according to aspects of the present disclosure.

Referring now to FIG. 2, FIG. 2 sets forth a flowchart of an example process for providing active session revocation of a user according to aspects of the present disclosure. In some implementations the process is performed by the active session user revocation module 150, however any suitable component may carry out the process and the process operations may be split among multiple components as desired. Also, operations may be carried out in any suitable order as desired. As shown in block 200, the active session user revocation module 150, in some implementations receives an active session user revocation request from the security administrator 152 through a resource manager or through any suitable interface to revoke a user during an active session. In some implementations, the active session user revocation request includes a user identifier (user ID) of the user. As shown in block 202, the active session user revocation module 150 updates the active session access revocation list (ASARL) 155 that includes data representing the user, such as the user ID from the active session user revocation request. As shown in block 204, the active session user revocation module 150 revokes active user access for authorization requests received from the user for access to system resources during the active session and if desired for future access requests after the session has ended, such as for a future logon authentication request.

The active session user revocation module 150 revokes active user access to protected system resources by denying future active session user access for future active session authorization requests of the user once the user ID is on the list. For example, when the user makes an authorization request for a protected system resource after the user ID is put on the active session access revocation list 155, the request is denied and all future incoming authorization requests during the active session for that user are denied. In certain implementations, the active session user revocation module 150 also stores revocation data in the user profile of the user in the security manager database 153 based the user ID from the active session user revocation request for use in revoking the user as part of the user authentication process when the user attempts to logon to the system after the active session has ended. For example, the security manager denies future user authentication of the user based on the active session user revocation request. Also, other users are added to the ASARL 155 when their user ID appears in active session user revocation requests from the administrator.

Figure 3:
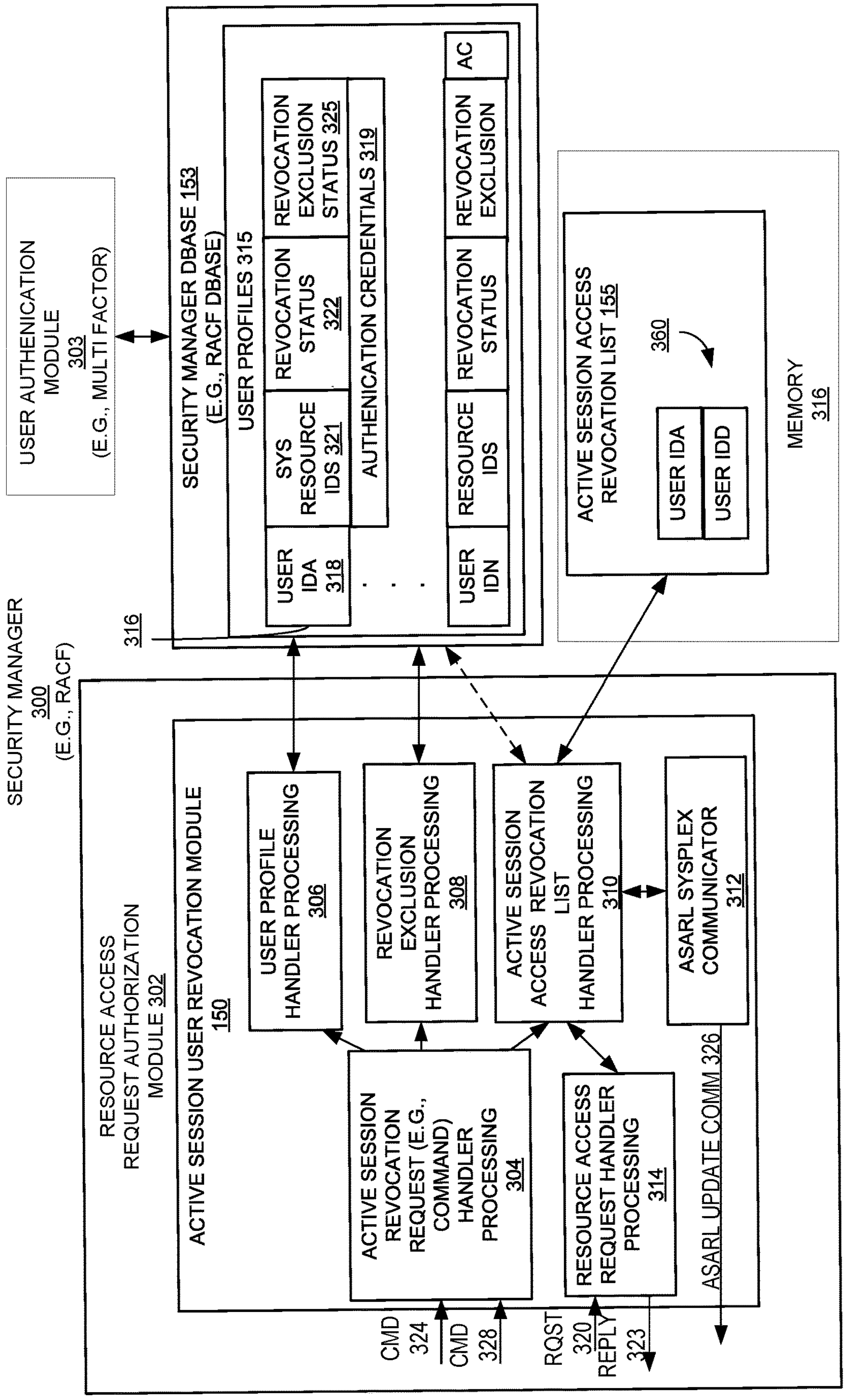
FIG. 3 sets forth a block diagram of an example active session user revocation module according to aspects of the present disclosure.

Referring now to FIG. 3, FIG. 3 sets forth a block diagram of an example active session user revocation module according to aspects of the present disclosure. In this example, the active session user revocation module 150 is added as a facility as part of a resource access request authorization module 302 in the security manager 300. However, the operations described herein may be incorporated into any suitable component as desired. The arrows illustrate communication paths among the components, such as communication buses, service calls, API calls, or any suitable communication mechanism. Also in this example, the security manager 300 includes a user authentication module 303 that performs multifactor user authentication as known in the art to grant user logon.

In this example, the active session user revocation module 150 includes various components (such as executing code) that perform processing as described here. In this implementation, the active session user revocation module 150 includes an active session revocation command handler component 304, a user profile handler component 306, a revocation exclusion handler component 308, an active session access revocation list handler component 310, an ASARL sysplex communicator 312 and a resource access request handler component 314.

The security manager database 153 includes user profiles 315 for each user (and group of users). In this example each user profile 315 includes defined user data in various database fields such as a user ID 318 and associated user attribute data. For example, the user profile 315 includes user authentication credentials 319 (e.g., cryptographic keys) used by the user authentication module 303 to authenticate the user for logon, revocation status data 322 indicating whether the user has been revoked by an administrator, and revocation exclusion status data 325 indicating that the user has been designated to be excluded from the ASARL 155. If desired, identification data 321 that identifies protected system resources that the user has been approved to access may also be in the user profile. In this example, not all user profile data, policy information or rules information is shown for ease of explanation, but it will be recognized that other user related information is stored in a user profile data structure.

In some implementations, user authentication is performed using user authentication credentials 319, such as a password or other credentials, stored in the user's profile 315 in the security manager database 151. For example, as part of a user logon process the user may be required to use two-factor authentication to authenticate to the system. If authentication fails, the user is denied logon. If the user authentication passes, the user is granted an active session to use the system to run applications or perform other operations and make authorization requests to access various protected system resources.

The resource access request authorization module 302 is part of a security server and is executing code or stored code that when executed causes one or more processors to provide access control for protected system resources. In this example, the resource access request authorization module 302 uses the active session user revocation module 150 to, among other operations, (1) process authorization requests 320 from users in active sessions for access to protected system resources and provide replies 323 to the authorization requests, (2) respond to issued active session user revocation requests 324 and other commands from system administrators, (3) create and update the ASARL 155, (4) update user profiles with revocation status data 322 and revocation exclusion status data 325 and if desired (5) provide sysplex update communication 326 relating to the ASARL 155 for other systems that provide resource access to a common user.

Figure 4:
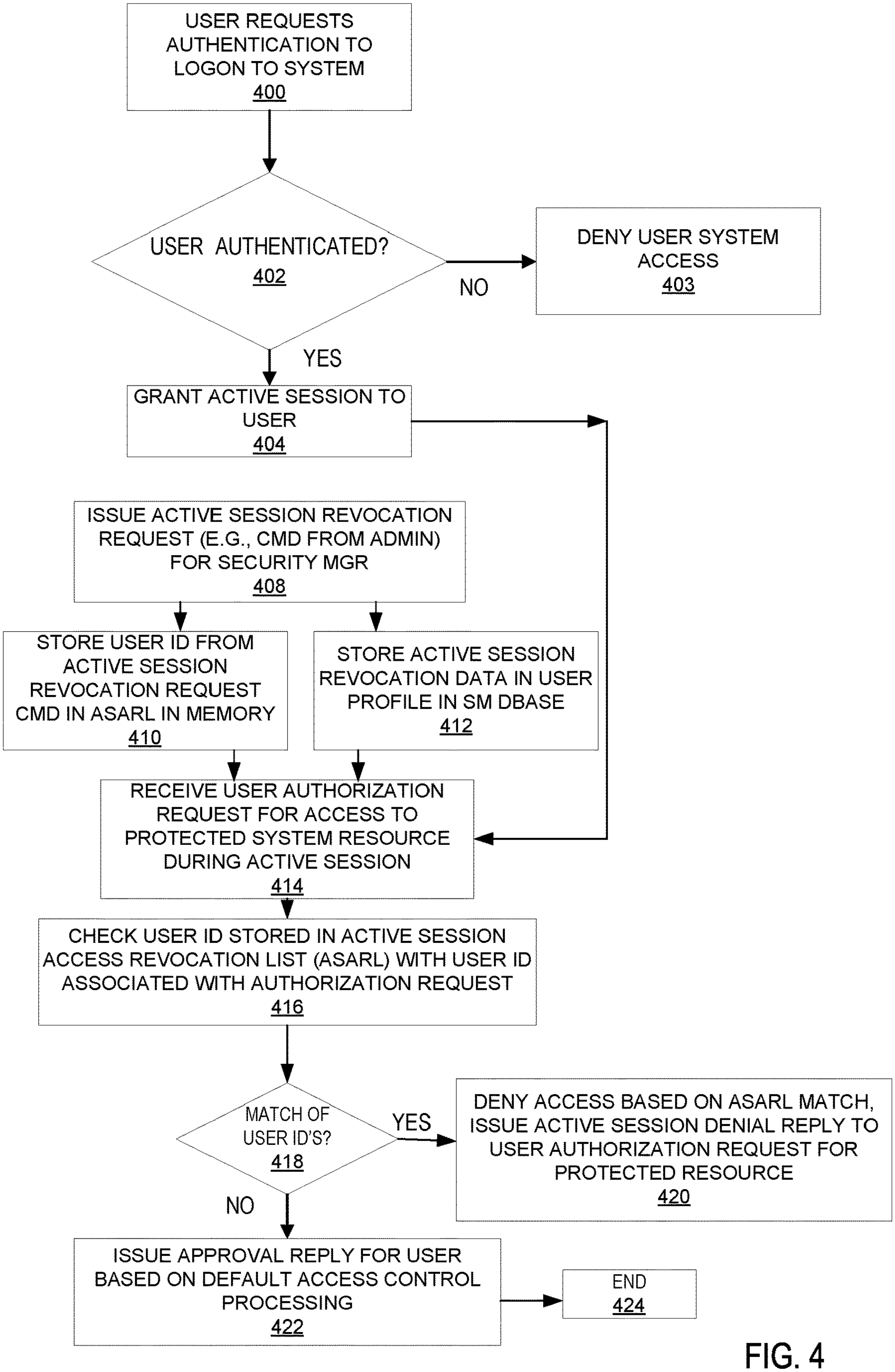
FIG. 4 sets forth a more detailed flowchart of an example process for revoking user access during an active session according to aspects of the present disclosure.

Referring now also to FIG. 4 and FIG. 5, FIG. 4 sets forth a more detailed flowchart of an example of a process for revoking user access during an active session according to aspects of the present disclosure that will be described with reference to FIG. 3. FIG. 5 sets forth a communication flow diagram for revoking user access during an active session according to aspects of the present disclosure. As shown in block 400, the process includes the security manager 300 receiving a user authentication request 500 to log in to the computing system. The user authentication request 500 includes the user ID associated with the user attempting to log in. As shown in block 402 the process includes the security manager 300 determining whether to authenticate the user by, for example, using the user ID to access 502 the associated user profile of the requesting user in the security manager database 153. The user authentication module 303 checks the revocation status data 322 and if it indicates that the user status is revoked, the user authentication module 303 denies user logon as shown in block 403 and sends a user authentication reply 504 indicting the denial. If the revocation status indicates that the user is not revoked, the authentication module 303 compares the user authentication credentials 319 in the security manager database 153 with user credential supplied in the authentication request and through other channels if desired. This process includes performing conventional multifactor authentication processes. If the user credentials are authenticated, such as a user password or biometrics and use of a second factor device such as a mobile device, the process continues to block 404 and the user is granted an active session. In some examples this includes the security manager 300 sending a user authentication reply 504 granting user authentication to the user.

As shown in block 404 the user is granted an active session after being authenticated, to get access to system protected resources, in some implementations, all active session user authorization requests 320 are processed by the security manager 300. Each active session user authorization request 320 includes the user ID of the user requesting the protected resource along with a protected system resource identifier 321 that identifies the resource being accessed. As shown in block 414, once the user is granted the active session, the resource access request handler component 314 receives an active session user authorization request 320 for access to protected system resources during the active session. As shown in blocks 416 and 418, the active session access revocation list handler component 310 checks the user IDs 360 stored in the active session access revocation list (ASARL) 155 with the user ID from the authorization request 320 to see if there is a match. In this example, the checking of the user identifier stored in the active session access revocation list in memory for the match is done without checking the user revocation data in the user profile database. This is a fast lookup approach employed to improve security of the system. When the user ID from the authorization request 320 is in the ASARL 155 a match is found. As shown in block 420 the authorization request 320 is denied and a reply 323 indicating the denial is sent by the resource access request handler component 314 in response to the request 320. As shown in block 422 if there is no match found, an approval reply is issued for the user based on default access control processing that allows the user access to the protected system resources. As shown in block 424 the process continues as needed. The ASARL 155 is typically a short list identifying bad actors and is stored in memory 316 instead of as part of user profiles in the security database 153. Accessing the short ASARL 155 in memory 316, such as virtual memory managed by the operating system and in some implementations is located in a cache memory, or random access memory, and moved to persistent memory on power down, is a fast operation and results in quick active session revocation when needed.

In some implementations, the ASARL 155 is updated when a first user ID is added to the ASARL 155 and/or when an additional user is added to the ASARL 155. A user is added to the ASARL in response to an issued active session revocation request 324 from a security administrator or other component as shown in block 408. In some implementations, the active session revocation request 324 is implemented as a new ALTUSER command with an added extension indicating to the RACF that the command is for an active session user revocation. The active session revocation request, in some implementations includes or points to data representing a UserID of the user to be revoked.

Referring again to FIG. 4 and FIG. 5, to revoke a user during an active session, a user ID for the user is added to the ASARL 155 during an active session. For example, the security administrator 152 issues the active session revocation request 324 which is received by the active session revocation command handler component 304 of the security manager 300. As shown in block 410, the active session access revocation list component 310 stores the user ID from the active session revocation request 324 in memory 316. In addition, as shown in block 412 the active session revocation command handler component 304 informs the user profile handler component 306 to update the revocation status data 322 of the corresponding user profile in the security manager database 153 to indicate that the user has been revoked. This is also shown on FIG. 5 by arrows 510 and 512. As such, the security manager, in response to receiving the active session user revocation request 324 stores a user identifier associated with the user, in the active session access revocation list 155 in memory 316 and stores user revocation data 322 in the user profile database 153. Once the user ID has been added to the ASARL 155, subsequent authorization requests by the user for active session accesses are denied in response to the user authorization request from the user in active session. As previously described with reference to blocks 416-420 and as shown by line 540 the active session access revocation list component 310 checks the user identifier stored in the active session access revocation list in memory for a match with a user identifier associated with the user authorization request and denies access to the requested protected system resources when a match is found.

In some implementations, a security administrator 152 is configured to issue a user exclusion command 328. The revocation exclusion hander component 308 processes the user exclusion commands 328 that are routed by the active session revocation command handler component 304. The user exclusion command 328 in some implementations is another extension of an ALTUSER command in an RACF. The user exclusion command 328 includes a user ID of an associated user and causes, as shown by arrow 542, the updating of the user profile with revocation exclusion status data 325 indicating that the associated user is prevented from being added to the active session access revocation list 155. In response to receiving an active session user revocation request 324 identifying the associated user, the active session access revocation list handler component 310 checks the revocation exclusion status data 325 in the user profile, as shown by arrow 544 (and by dashed arrow in FIG. 3), and denies the received active session user revocation request 324 and as shown by arrow 550 sends a deny reply to the administrator.

In one example the administrator is also configured to issue an ASARL user removal command 560 to remove a user (user ID) from the ASARL after the user has been placed in the ASARL. The ASARL user removal command 560 includes the user ID of the user to be removed from the ASARL. In this example, the active session revocation command handler component 304 routes the ASARL user removal command 560 to the active session access revocation list handler component 310. The active session access revocation list handler component 310 removes the user ID identified in the ASARL user removal command 560 from the ASARL as shown by line 570 and also changes the revocation status data 322 associated with the user ID to indicate that the user is not revoked as shown by line 572. The active session revocation command handler component 304 sends a reply confirming the removal from the ASARL. It will be recognized that the above processes were described with reference to certain components within the security manager but that the operations may be performed by any suitable component or group of components as desired.

Figure 6:
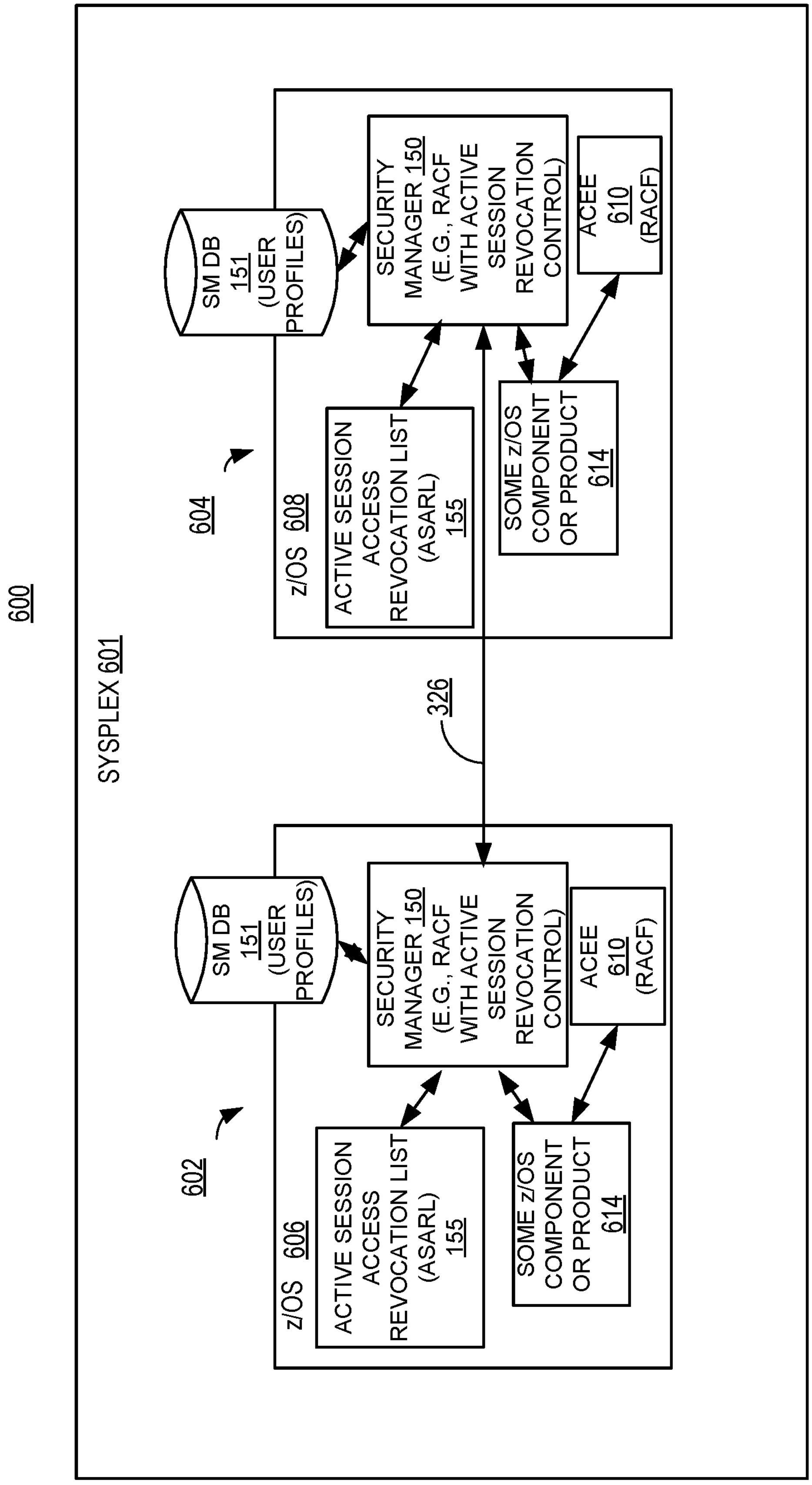
FIG. 6 sets forth another example computing environment according to aspects of the present disclosure.

Referring now to FIG. 6, FIG. 6 sets forth a block diagram of a computing system that employs an IBM sysplex. In this example, computing environment 600 includes a computing system such as an IBM Z @mainframe, however any suitable computing system may be employed. In a particular embodiment, the computing system includes the computer 101 described with respect to FIG. 1. The computing environment 600 includes a sysplex 601 which is a collection of z/OS systems, such as a first system 602 and a second system 604 that cooperate, using certain hardware and software products, to process work. For example, each of the first system 602 and the second system 604 include a computer 101 or can be on the same computer 101, and each includes an operating z/OS operating system image 606 and 608 respectively. In this example, each operating z/OS operating system image 606 and 608 is in a same security domain and includes a same type of security manager 300 such as an external security manager such as an IBM RACF. Each system includes a security manager 300, a security manager database 151, an active session access revocation list 155, an Accessor Environment Element (ACEE) 610, and one or more z/OS components or products 614 that also use the security manager 300. An ACEE is the entirety of a runtime security context for a client z/OS. Resource access requests on an ACEE level are managed by the security manager.

As shown there is a first security manager for a first security system and a security manager for a second security system. A user has authentication credentials for both the first and second security systems. Since the user has the same user profile name on both systems resource access can be affected by active revocation using that name on both systems. The first security manager sends an update communication to the second security manager to add the user to a corresponding active session access revocation list in the second security system or make other updates to a local ASARL based on the communication from another system.

For example, in this implementation, when an ASARL is updated in one system, each security manager sends an update communication 326, such as an ENF signal to the other security manager of the other system within the sysplex that causes a respective active session revocation module within a security manager to update their respective ASARL to add the revoked user to a corresponding ASARL in the other system. In this way a centralized full revocation operation across the sysplex is made. Each ASARL is up to date with the latest user revocation status in the sysplex. Similarly, communications reflecting other changes to a system's ASARL are shared with the other system. For example, when a command to remove a user from an ASARL is processed, the changes to the ASARL are communicated to the other system which updates their respective ASARL in the same way.

As disclosed herein, in some implementations, the active session revocation list is stored in memory as a list or table data structure as opposed to for example being stored as part of the user profile in the user profile database. This configuration provides for a faster review and implementation of a revocation process during an active session and does not require additional access and processing of user attributes in the user profile in the security manager database. However, it will be recognized that the active session revocation list in some implementations is stored in the security manager database and in other implementations is updated from user attributes in the user profile database if desired.

The security of the computing platform is strengthened by allowing administrators to disallow all system resource accesses for specific users, both for active sessions and new sessions. Active session resource access requests are denied unlike prior systems. In some implementations, a type of immediate revocation of specific users is provided by using a short list that only includes those users who have been designated as fully revoked (e.g., revoked from accessing resources during an active session from future sessions) from the system. In some implementations a fast denial is also provided by storing and interrogating the active session access revocation list from memory instead of having to interrogate from user attributes stored in the user profile database. A centralized list of users for all protected system resources is maintained by the security manager who the security administrator identifies as fully revoked. This list is updated with the specified user IDs when the active session revocation facility is invoked. When an access request is made, this list is interrogated and if the user requesting access is in the list, the active session access attempt will be disallowed. Thus, fully revoked users will no longer have access to any system resources.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time. A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving an active session user revocation request to revoke a user during an active session;

updating an active session access revocation list that includes data representing the user, in response to the active session user revocation request;

revoking active user access to protected system resources for the user based on the updated active session access revocation list, during the active session;

receiving, from a device of the user, a request to access the protected system resources during the active session;

determining whether a user profile, of the user, includes user revocation data based on receiving the request, wherein the user revocation data indicates that the active user access to protected system resources has been revoked;

determining, based on receiving the request and during the active session, that the data representing the user is included in the active session access revocation list; and preventing the device from accessing the protected system resources during the active session based on determining that the data representing the user is included in the active session access revocation list and when the user profile includes the user revocation data.

2. The method of claim 1, wherein revoking active user access to protected system resources comprises denying future active session user access for future active session authorization requests of the user based on determining that the data representing the user is included in the active session access revocation list.

3. The method of claim 2, further comprising denying future user authentication of the user based on the active session user revocation request.

4. The method of claim 1, further comprising in response to receiving the active session user revocation request:

storing a user identifier associated with the user, in the active session access revocation list in memory; and storing the user revocation data in a user profile database.

5. The method of claim 4, further comprising:

in response to a user authorization request for access to a protected system resource, checking the user identifier stored in the active session access revocation list in memory for a match with a user identifier associated with the user authorization request; and denying access to the requested protected system resources when a match is found.

6. The method of claim 1, further comprising sending a communication to a security manager of another security system that causes an update to add the user to a corresponding active session access revocation list in the another security system.

7. The method of claim 2, further comprising receiving a user exclusion command associated with an associated user and updating the user profile with data indicating that the associated user is prevented from being added to the active session access revocation list; and in response to receiving an active session user revocation request identifying the associated user, deny the received active session user revocation request.

8. The method of claim 5, comprising checking the user identifier stored in the active session access revocation list in memory for the match without checking the user revocation data in the user profile database.

9. An apparatus comprising:

a processing device; and memory operatively coupled to the processing device, wherein the memory stores computer program instructions that, when executed, cause the processing device to:

in response to an active session user revocation request to revoke a user during an active session, update an active session access revocation list that includes data representing the user;

revoke active user access to protected system resources for the user based on the updated active session access revocation list, during the active session;

receive, from a device of the user, a request to access the protected system resources during the active session;

determine, based on receiving the request and during the active session, that the data representing the user is included in the active session access revocation list;

determine whether a user profile, of the user, includes user revocation data based on receiving the request, wherein the user revocation data indicates that the active user access to protected system resources has been revoked; and prevent the device from accessing the protected system resources during the active session based on determining that the data representing the user is included in the active session access revocation list and when the user profile includes the user revocation data.

10. The apparatus of claim 9, wherein the memory stores computer program instructions that, when executed, cause the processing device to: revoke active user access to protected system resources by denying future active session user access for future active session authorization requests of the user.

11. The apparatus of claim 10, wherein the memory stores computer program instructions that, when executed, cause the processing device to: deny future user authentication of the user based on the active session user revocation request.

12. The apparatus of claim 9, wherein the memory stores computer program instructions that, when executed, cause the processing device to, in response to receiving the active session user revocation request:

store a user identifier associated with the user, in the active session access revocation list in memory; and store the user revocation data in a user profile database.

13. The apparatus of claim 12, wherein the memory stores computer program instructions that, when executed, cause the processing device to: in response to a user authorization request for a protected system resource, check the user identifier stored in the active session access revocation list in memory for a match with a user identifier associated with the user authorization request; and deny access to the protected system resources when a match is found.

14. The apparatus of claim 9, wherein the memory stores computer program instructions that, when executed, cause the processing device to:

provide a first security manager for a first security system and provide a second security manager for a second security system wherein a user has authentication credentials for both the first and second security systems; and cause the first security manager to send an update communication to the second security manager to add the user to a corresponding active session access revocation list in the second security system.

15. The apparatus of claim 10, wherein the memory stores computer program instructions that, when executed, cause the processing device to:

update the user profile with data indicating that an associated user is prevented from being added to the active session access revocation list, in response to a user exclusion command associated with a user; and in response to receiving an active session user revocation request identifying the associated user, deny the received active session user revocation request.

16. The apparatus of claim 13, wherein the memory stores computer program instructions that, when executed, cause the processing device to: check the user identifier stored in the active session access revocation list in memory for the match without checking the user revocation data in the user profile database.

17. A computer program product comprising a computer readable storage medium, wherein the computer readable storage medium comprises computer program instructions that, when executed:

in response to an active session user revocation request to revoke a user during an active session, update an active session access revocation list that includes data representing the user;

revoke active user access to protected system resources for the user based on the updated active session access revocation list, during the active session;

receive, from a device of the user, a request to access the protected system resources during the active session;

determine, based on receiving the request and during the active session, that the data representing the user is included in the active session access revocation list;

determine whether a user profile, of the user, includes user revocation data based on receiving the request, wherein the user revocation data indicates that the active user access to protected system resources has been revoked; and prevent the device from accessing the protected system resources during the active session based on determining that the data representing the user is included in the active session access revocation list and when the user profile includes the user revocation data.

18. The computer program product of claim 17, comprising computer program instructions that, when executed:

revoke active user access to protected system resources by denying future active session user access for future active session authorization requests of the user; and deny future user authentication of the user based on the active session user revocation request.

19. The computer program product of claim 17, comprising computer program instructions that, when executed:

store a user identifier associated with the user, in the active session access revocation list in memory;

store the user revocation data in a user profile database;

in response to a user authorization request for a protected system resource, check the user identifier stored in the active session access revocation list in memory for a match with a user identifier associated with the user authorization request, without checking the user revocation data in the user profile database; and deny access to the requested protected system resources when a match is found.

20. The computer program product of claim 19, comprising computer program instructions that, when executed:

update the user profile with data indicating that an associated user is prevented from being added to the active session access revocation list, in response to a user exclusion command; and in response to receiving an active session user revocation request identifying the associated user, deny the received active session user revocation request.

* * * * *